(12) United States Patent
Hitomi et al.

(10) Patent No.: US 6,971,343 B2
(45) Date of Patent: Dec. 6, 2005

(54) SPARK-IGNITION ENGINE CONTROLLER

(75) Inventors: Mitsuo Hitomi, Fuchu-cho (JP); Kouji Sumida, Fuchu-cho (JP); Takayoshi Hayashi, Fuchu-cho (JP)

(73) Assignee: Mazda Motor Corporation, Hiroshima (JP)

(*) Notice: Subject to any disclaimer, the term of this patent is extended or adjusted under 35 U.S.C. 154(b) by 147 days.

(21) Appl. No.: 10/680,344

(22) Filed: Oct. 8, 2003

(65) Prior Publication Data

US 2004/0065279 A1    Apr. 8, 2004

(30) Foreign Application Priority Data

Oct. 8, 2002  (JP) .............................. 2002-294835

(51) Int. Cl.$^7$ ............................................. F02B 75/20
(52) U.S. Cl. ................... 123/58.8; 123/295; 123/27 R
(58) Field of Search .................... 123/58.8, 64, 295, 123/299, 301, 302, 308, 27 R (56) References Cited

U.S. PATENT DOCUMENTS

| | | | |
|---|---|---|---|
| 4,194,472 A | 3/1980 | Amano et al. | |
| 4,237,832 A | 12/1980 | Hartig | |
| 2001/0017123 A1 | 8/2001 | Raab et al. | |

FOREIGN PATENT DOCUMENTS

JP    10-274085    10/1998

*Primary Examiner*—Noah P. Kamen
(74) *Attorney, Agent, or Firm*—Nixon Peabody LLP; Donald R. Studebaker (57) ABSTRACT

Burned gas discharged from an exhaust stroke side preceding cylinder of a pair of cylinders having an overlapping exhaust stroke and intake stroke is introduced as is into an intake stroke side following cylinder through an intercylinder gas channel, and only the gas which is discharged from the following cylinder is led into an exhaust passage. Particularly during low loads and idling, combustion is performed in the preceding cylinder at an ultra-lean air-fuel ratio of at least three times the stoichiometric air-fuel ratio, and in the following cylinder, combustion is performed by spark ignition at a substantially stoichiometric air-fuel ratio by feeding fuel to the burned gas introduced from the preceding cylinder. In the following cylinder, combustion is performed through compression ignition in accordance with increases in the load.

5 Claims, 9 Drawing Sheets

SPARK-IGNITION ENGINE CONTROLLER

BACKGROUND OF THE INVENTION

1. Field of the Invention

The present invention relates to a spark-ignition engine controller, and more particularly to a device for controlling the combustion condition in each cylinder of a multi-cylinder engine in order to improve fuel economy and reduce emissions.

2. Description of the Related Art

Recently, technology has been researched for improving fuel economy in a spark-ignition engine by performing combustion with the air-fuel ratio of the air-fuel mixture in each cylinder set to a lean air-fuel ratio which is larger than the stoichiometric air-fuel ratio. It is also known that by providing a fuel injector for injecting fuel directly into the combustion chamber and performing stratified charge combustion by injecting fuel from the fuel injector in the compression stroke within a low-speed low-load range or the like, ultra lean combustion can be realized (see Japanese Unexamined Patent Application Publication H10-274085, for example).

When ultra-lean combustion is performed by stratified charge combustion in the manner described above, thermal efficiency is improved and manifold air pressure decreases due to the increased quantity of intake air, leading to a large improvement in fuel economy. Further, in this state of ultra-lean stratified charge combustion, sufficient combustion can be achieved even when a part of the surplus air is replaced with exhaust gas produced by EGR (exhaust gas recirculation), and thus a comparatively large amount of EGR is possible, which is advantageous in terms of NOx reduction and the like. The effect of a reduction in pumping loss is achieved even when a large amount of EGR is performed, and thermal efficiency is increased in comparison with normal combustion in which the amount of intake air and the amount of EGR are limited due to non-stratification. As a result, fuel economy is improved.

When stratified charge combustion is performed, to a certain extent the effect of an improvement in fuel economy increases as the air-fuel ratio becomes leaner. When the air-fuel ratio becomes lean to or beyond a certain extent, however, the combustion speed becomes too slow and combustion near the final combustion phase does not contribute to the work, leading to a deterioration in the fuel economy. Hence improvements in fuel economy through lean stratified charge combustion are limited.

As an alternative method of improving fuel economy, compression ignition has been researched. In compression ignition, the temperature and pressure inside the combustion chamber are raised in the final phase of the compression stroke, similarly to a diesel engine, whereby the fuel is caused to self-ignite. When such compression ignition is performed, the entire content of the combustion chamber burns at once even when the air-fuel ratio is ultra lean or a large amount of EGR is performed, and thus slow combustion which does not contribute to the work is avoided and fuel economy is improved.

In a typical spark-ignition engine (gasoline engine), however, spark ignition is required for combustion, and thus the temperature and pressure inside the combustion chamber in the vicinity of compression top dead center cannot be raised to an extent at which compression ignition occurs. Hence, in order to cause compression ignition, specific measures must be taken to greatly raise the temperature or pressure inside the combustion chamber.

In response to these problems, the present applicant has considered technology for a multi-cylinder engine which performs a cycle comprising an intake stroke, a compression stroke, an expansion stroke, and an exhaust stroke according to which, in at least a low-load low-speed range, burned gas discharged from an exhaust stroke side preceding cylinder of a pair of cylinders having an overlapping exhaust stroke and intake stroke is introduced as is into a following cylinder, which is the cylinder on the intake stroke side, and the gas discharged from the following cylinder is led to an exhaust passage. During this state of two-cylinder connection, combustion is performed by spark ignition in the preceding cylinder at an air-fuel ratio that is leaner than the stoichiometric air-fuel ratio by a predetermined amount, whereas in the following cylinder fuel is fed to the lean air-fuel ratio burned gas introduced from the preceding cylinder such that combustion is performed by compression ignition (Japanese Patent Application 2002-029836).

In so doing, at least in a low-load low-speed range, combustion is performed by spark ignition at a lean air-fuel ratio in the preceding cylinder, leading to an increase in thermal efficiency, a reduction in pumping loss, and thus to a great improvement in fuel economy, and in the following cylinder combustion is performed by feeding fuel to the lean air-fuel ratio burned gas introduced from the preceding cylinder. At this time, the gas which is led from the preceding cylinder through an intercylinder gas channel is at a high temperature, causing the temperature inside the combustion chamber to rise to an extent at which compression ignition is possible in the final phase of the compression stroke. Thus compression ignition is performed. Combustion is performed rapidly due to the compression ignition, and thus combustion efficiently contributes to the work. This, and the reduction in pumping loss, enables a great improvement in fuel economy.

Note that particularly in a low-load range within the operating range where this type of two-cylinder connection is created, the fuel injection quantity is low, meaning that the temperature of the burned gas introduced from the preceding cylinder into the following cylinder is also low, and consequently, the temperature in the interior of the following cylinder is sometimes unable to reach a suitable temperature for compression ignition to take place. In such a low temperature condition, combustion through spark ignition is performed in the following cylinder also in order to achieve combustion stability.

However, when combustion is performed through spark ignition in the following cylinder during this type of low temperature condition, the improvement in fuel economy in this range cannot match the effect achieved when combustion is performed by compression ignition, and hence there is room for further improvements in fuel economy.

SUMMARY OF THE INVENTION

The present invention has been designed in consideration of these problems, and it is an object thereof to provide a spark-ignition engine controller according to which a further overall improvement in fuel economy can be achieved by improving fuel economy in a low temperature condition, when the temperature inside a following cylinder has not reached a suitable temperature for compression ignition, of an operating range where a two-cylinder connection is created, and by quickly moving from such a low temperature condition to a condition in which combustion is performed through compression ignition.

In order to achieve the aforementioned object according to the present invention, a spark-ignition engine controller used for a multi-cylinder spark-ignition engine performing a four cycle consisting of an intake stroke, a compression stroke, an expansion stroke, and an exhaust stroke at a predetermined phase difference in each cylinder, wherein a gas flow path is formed into a state of two-cylinder connection where, in at least a low-load low-speed range, determined by an operation condition identifier, burned gas discharged from a preceding cylinder, which is a cylinder in the exhaust stroke, of a pair of cylinders having an overlapping exhaust stroke and intake stroke is introduced as is into a following cylinder, which is a cylinder on the intake stroke side, through an intercylinder gas channel, and exhaust gas discharged from the following cylinder is led to an exhaust passage. The spark-ignition engine controller includes: the operation condition identifier (41) for determining an engine operation condition based on an engine speed and an engine load; an intake air quantity controller (43) for controlling an amount of an air to be supplied to the preceding cylinder in such a manner that the air/fuel ratio based on the amount of fuel required to both of the preceding and the following cylinders becomes a stoichiometric air-fuel ratio in the cylinders in the two-cylinder connection state; and a combustion controller (44) including a fuel injector (45) for injecting fuel at a certain timing in which an amount of fuel injected to both of preceding and following cylinders is determined in accordance with a required torque in the state of two-cylinder connection; and an ignition controller (46) for controlling an ignition timing such that the combustion controller (44) which, during the two-cylinder connection, causes combustion to be performed in the preceding cylinder at an air-fuel ratio which is leaner than the stoichiometric air-fuel ratio by a predetermined amount, and causes combustion to be performed in the following cylinder at a predetermined air-fuel ratio by feeding fuel to the lean air-fuel ratio burned gas introduced from said the preceding cylinder, wherein the combustion controller (44) performs control such that, in at least a part of an operating range in which the two-cylinder connection is set, combustion is performed in the following cylinder through compression ignition, and the combustion controller (44) controlling, in a low-load region among the operating range in which the two-cylinder connection is set, the injection controller (45) and the ignition controller (46) such that an air-fuel ratio of the preceding cylinder is set such that an excess air ratio of the preceding cylinder becomes three or greater than three and a combustion is performed in the following cylinder by spark ignition at an air-fuel ratio being equal to a stoichiometric air-fuel ratio.

According to this constitution, in at least a low-load low-speed range, combustion is performed in the preceding cylinder at a lean air-fuel ratio having excess air, and by means of this lean combustion, thermal efficiency is increased and pumping loss is reduced, leading to a large improvement in fuel economy. In the following cylinder, combustion is performed by feeding additional fuel to the lean air-fuel ratio burned gas introduced from the preceding cylinder. The temperature of the gas introduced from the preceding cylinder through the intercylinder gas channel is high, and hence vaporization of the additional fuel is enhanced, whereby favorable combustion can be obtained in the following cylinder. Further, by performing combustion at a lean air-fuel ratio in the preceding cylinder, the amount of NOx generated is suppressed to a comparatively low level, and by introducing burned gas from the preceding cylinder into the following cylinder, a similar state to when a large amount of EGR is performed can be obtained, whereby NOx generation is sufficiently suppressed. When compression ignition is performed in the following cylinder under heavy EGR condition, combustion is performed at once throughout the entire combustion chamber, thereby minimizing cycle loss and cooling loss and obtaining a large improvement in fuel economy.

When combustion is performed through spark ignition during a low temperature condition in which it is determined that the temperature inside the following cylinder has not reached a suitable temperature for combustion through compression ignition, the air-fuel ratio in the preceding cylinder is increased (toward the lean side), and by means of this lean combustion, thermal efficiency is improved. In the following cylinder, a fuel is injected to set air-fuel ratio at stoichiometric. In other words, if the intake air quantity is constant, then the total quantity of fuel fed to the preceding cylinder and following cylinder is constant (the ratio of the intake air quantity and the total fuel quantity is the stoichiometric air-fuel ratio). Hence the quantity of fuel fed to the following cylinder increases by the amount of increase in the air-fuel ratio caused by reducing the amount of fuel fed to the preceding cylinder. The intake gas of the following cylinder is the high-temperature burned gas introduced from the preceding cylinder, precipitating vaporization of the fuel, and thus combustibility is improved and pumping loss is even lower than in the preceding cylinder. By increasing the ratio of fuel burned in the following cylinder, a further overall improvement in fuel economy can be achieved. Further, by increasing the quantity of fuel fed to the following cylinder, the temperature inside the cylinder rises quickly, enabling a rapid progression to combustion through compression ignition, and thus a greater improvement in fuel economy can be obtained.

These and other objects, features, and advantages of the present invention will become more apparent upon reading the following detailed description along with the accompanying drawings.

BRIEF DESCRIPTION OF THE DRAWINGS

FIG. 2 is a schematic sectional view of the body of the engine and so on;

DESCRIPTION OF THE PREFERRED EMBODIMENTS

Figure 1:
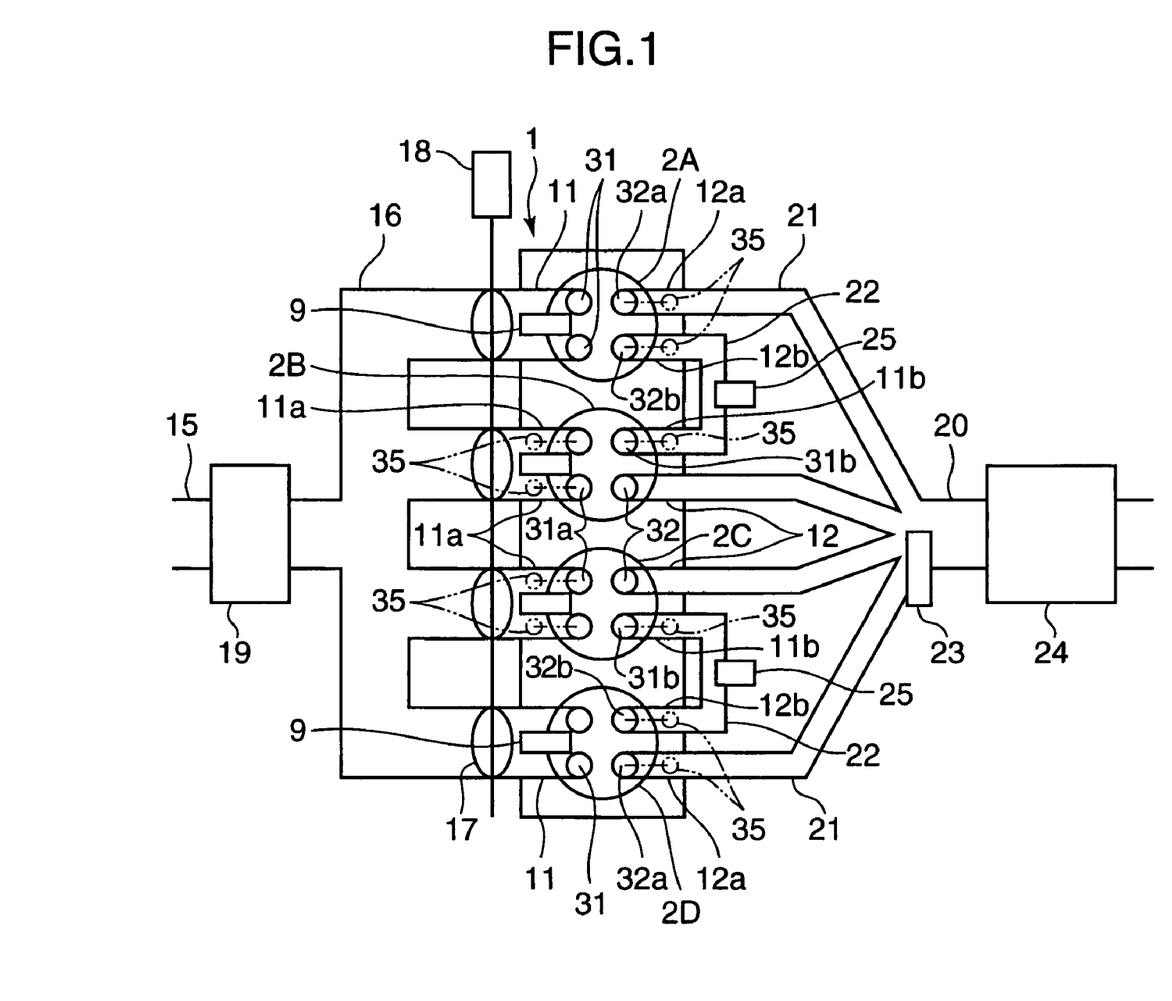
FIG. 1 is a schematic plan view of an entire engine comprising a device according to an embodiment of the present invention.
Figure 2:
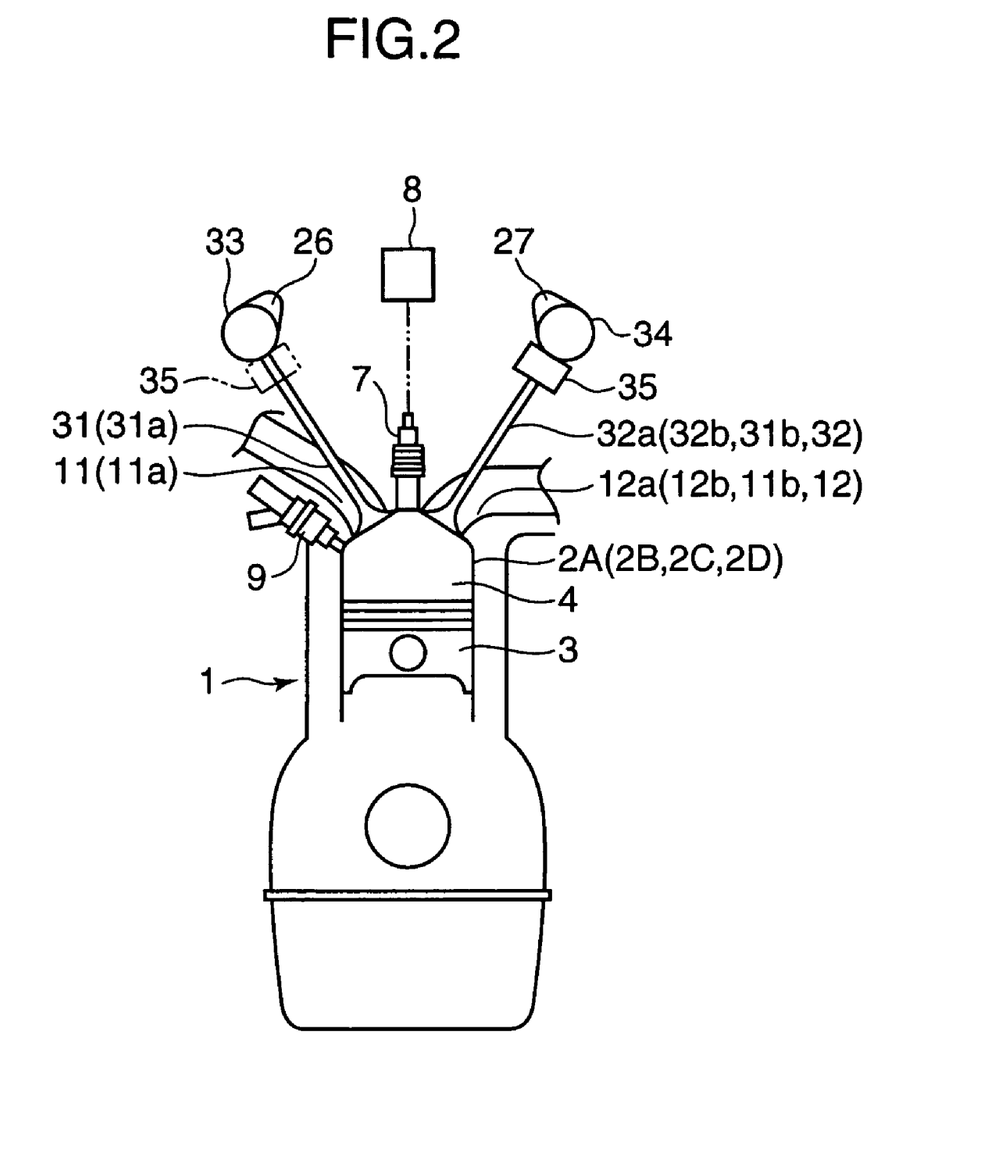

An embodiment of the present invention will be described below on the basis of the drawings. FIG. 1 shows the schematic constitution of an engine according to an embodiment of the present invention, and FIG. 2 shows in outline the constitution of one cylinder of an engine body 1 and an intake valve, exhaust valve, and the like provided thereon. In these drawings, the engine body 1 comprises a plurality of cylinders, and in the illustrated embodiment comprises four cylinders 2A to 2D. A piston 3 is inserted into each of the cylinders 2A to 2D, and a combustion chamber 4 is formed above the piston 3.

A spark plug 7 is provided at the apex of the combustion chamber 4 of each cylinder 2A to 2D, and the tip end of the spark plug faces the interior of the combustion chamber 4. An ignition circuit 8 which is capable of controlling the ignition timing through electronic control is connected to the spark plug 7.

A fuel injector 9 for injecting fuel directly into the combustion chamber 4 is provided on a side portion of the combustion chamber 4. The fuel injector 9 is equipped with a needle valve and solenoid not shown in the drawing, and when a pulse signal is inputted, the valve is driven at the time of the pulse input so as to be opened for a length of time corresponding to the pulse width, whereby fuel is injected in a quantity corresponding to the time the valve is open. Note that the fuel injector 9 is supplied with fuel from a fuel pump not shown in the drawing via a fuel-feeding passage or the like, and that the fuel-feeding system is constructed so as to obtain a higher fuel pressure than the pressure inside the combustion chamber during the compression stroke.

Intake ports 11, 11a, 11b and exhaust ports 12, 12a, 12b are opened into the combustion chamber 4 of each cylinder 2A to 2D. An intake passage 15, an exhaust passage 20, and so on are connected to these ports, and each port is opened and closed by intake valves 31, 31a, 31b and exhaust valves 32, 32a, 32b.

Figure 5:
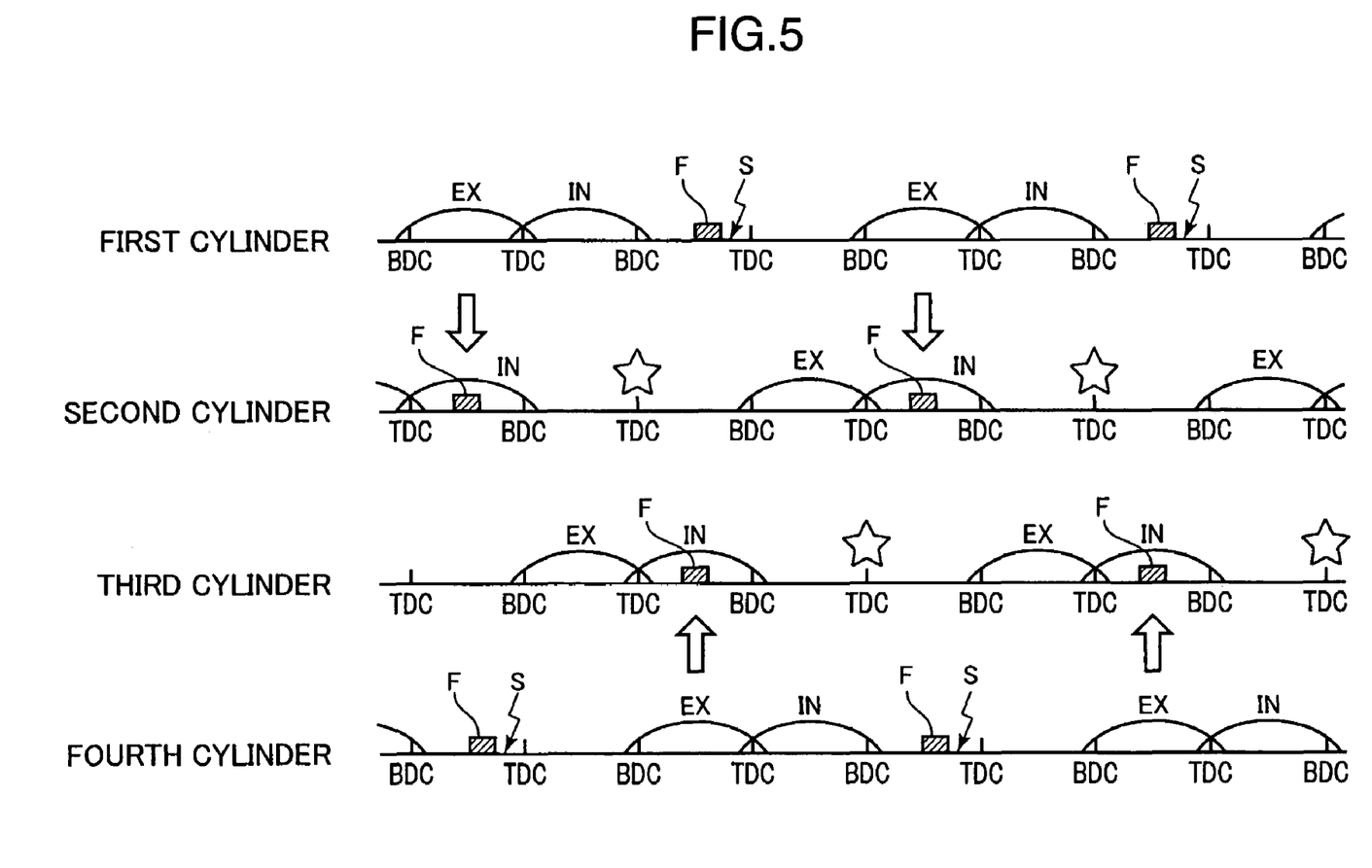
FIG. 5 is a view showing the exhaust stroke, intake stroke, fuel injection timing, spark ignition timing, and so on of each cylinder.

A cycle comprising an intake stroke, a compression stroke, an expansion stroke, and an exhaust stroke is performed in each cylinder at a predetermined phase difference. In the case of a four cylinder engine, a first cylinder 2A, a second cylinder 2B, a third cylinder 2C, and a fourth cylinder 2D are provided from one end side in the direction of the row of cylinders, and as shown in FIG. 5, the aforementioned cycle is performed sequentially in the first cylinder 2A, third cylinder 2C, fourth cylinder 2D, and second cylinder 2B at a phase difference of a 180° crank angle each time. Note that in FIG. 5, EX indicates the exhaust stroke, IN indicates the intake stroke, F indicates fuel injection, and S indicates spark ignition (forced ignition). The star-shaped symbols in the drawing indicate that compression ignition is performed (note, however, that during a low temperature condition, spark ignition is performed in the following cylinder).

An intercylinder gas channel 22 is provided between the pairs of cylinders which have an overlapping exhaust stroke and intake stroke so that burned gas can be introduced as is from the cylinder in the exhaust stroke (referred to as the preceding cylinder in this specification) when the exhaust stroke and intake stroke overlap to the cylinder on the intake stroke side (referred to as the following cylinder in this specification). In the four cylinder engine of this embodiment, as shown in FIG. 5, the exhaust stroke (EX) of the first cylinder 2A overlaps with the intake stroke (IN) of the second cylinder 2B, and the exhaust stroke (EX) of the fourth cylinder 2D overlaps with the intake stroke (IN) of the third cylinder 2C. Hence the first cylinder 2A forms a pair with the second cylinder 2B, and the fourth cylinder 2D forms a pair with the third cylinder 2C, the first cylinder 2A and fourth cylinder 2D serving as preceding cylinders, and the second cylinder 2B and third cylinder 2C serving as following cylinders.

The intake and exhaust ports of each cylinder and the intake passage, exhaust passage, and intercylinder gas channel connected thereto are constituted specifically as follows.

An intake port 11 for introducing fresh air, a first exhaust port 12a for delivering burned gas (exhaust gas) to the exhaust passage, and a second exhaust port 12b for guiding the burned gas to the following cylinder are arranged on each of the first cylinder 2A and fourth cylinder 2D serving as preceding cylinders. A first intake port 11a for introducing fresh air, a second intake port 11b for introducing burned gas from the preceding cylinder, and an exhaust port 12 for delivering the burned gas to the exhaust passage are arranged on each of the second cylinder 2B and third cylinder 2C serving as following cylinders.

In the example in FIG. 1, the intake port 11 in the first and fourth cylinders 2A, 2D and the first intake port 11a in the second and third cylinders 2B, 2C are provided two per cylinder in parallel on the left half side of the combustion chamber, whereas the first exhaust port 12a and second exhaust port 12b in the first and fourth cylinders 2A, 2D and the second intake port 11b and exhaust port 12 in the second and third cylinders 2B, 2C are provided in parallel on the right half side of the combustion chamber.

The downstream end of a branched intake channel 16 for each cylinder on the intake passage 15 is connected to the intake ports 11 in the first and fourth cylinders 2A, 2D and the first intake ports 11a in the second and third cylinders 2B, 2C. Multiple throttle valves 17 which engage with each other through a common shaft are provided near the downstream end of each branched intake channel 16. The throttle valve 17 is driven by an actuator 18 in accordance with a control signal to adjust the quantity of intake air. Note that an airflow sensor 19 for detecting the flow rate of the intake air is provided on a common intake passage upstream of the confluence point on the intake passage 15.

The upstream end of a branched exhaust channel 21 for each cylinder on the exhaust passage 20 is connected to the first exhaust ports 12a in the first and fourth cylinders 2A, 2D and the exhaust ports 12 in the second and third cylinders 2B, 2C. An intercylinder gas channel 22 is provided between the first cylinder 2A and second cylinder 2B and between the third cylinder 2C and fourth cylinder 2D respectively, the upstream end of the intercylinder gas channel 22 being connected to the second exhaust port 12b of the first and fourth cylinders 2A, 2D serving as preceding cylinders, and the downstream end of the intercylinder gas channel 22 being connected to the second intake port 11b of the second and third cylinders 2B, 2C serving as following cylinders.

A linear $O_2$ sensor 25, the output of which varies linearly in accordance with the oxygen concentration, is provided on each of the intercylinder gas channels 22, and the quantity of fuel injected into the preceding cylinders 2A, 2D having a predetermined lean air-fuel ratio is feedback-controlled in accordance with the output thereof.

An $O_2$ sensor 23 for detecting the air-fuel ratio by detecting the oxygen concentration in the exhaust gas is provided at the confluence point on the exhaust passage 20 downstream of the branched exhaust channels 21. The $O_2$ sensor 23 is a $\lambda O_2$ sensor whose output changes rapidly in the vicinity of the stoichiometric air-fuel ratio, and hence the quantity of fuel injected into the following cylinders 2B, 2C (and also the cylinders 2A, 2D when each cylinder is independent) is feedback-controlled on the basis of the output of this $O_2$ sensor 23. A three-way catalyst 24 is provided on the exhaust passage 20 downstream of the $O_2$ sensor 23 for performing exhaust gas purification. As is well-known, the three-way catalyst 24 exhibits a high level of purifying performance in respect of HC, CO, and NOx when the air-fuel ratio of the exhaust gas is near the stoichiometric air-fuel ratio (that is, the excess air factor $\lambda$ is $\lambda=1$).

The intake and exhaust valves for opening and closing the intake and exhaust ports of each cylinder and the valve mechanisms thereof are constituted as follows.

An intake valve 31, a first exhaust valve 32a, and a second exhaust valve 32b are respectively provided on the intake port 11, first exhaust port 12a, and second exhaust port 12b in the first and fourth cylinders 2A, 2D. A first intake valve 31a, a second intake valve 31b, and an exhaust valve 32 are respectively provided on the first intake port 11a, second intake port 11b, and exhaust port 12 in the second and third cylinders 2B, 2C. These intake and exhaust valves are each driven by a valve mechanism comprising camshafts 33, 34, and the like so as to open and close at a predetermined timing, whereby the intake stroke and exhaust stroke of each cylinder are performed at a predetermined phase difference such as that described above.

Further, from among these intake and exhaust valves, the first exhaust valve 32a, second exhaust valve 32b, first intake valve 31a, and second intake valve 31b are each provided with a valve stop mechanism 35 for switching the valves between an operative state and a stopped state. The valve stop mechanism 35 is well-known and hence not illustrated in detail, but is constructed, for example, by providing a hydraulic chamber which is capable of supplying and discharging operating fluid to and from a tappet interposed between cams 26, 27 of the camshafts 33, 34 and the valve stem such that when operating fluid is supplied to the hydraulic chamber, the action of the cams 26, 27 is transmitted to the valves and the valves open and close, but when operating fluid is discharged from the hydraulic chamber, the action of the cams 26, 27 is no longer transmitted to the valves and the valves close.

Figure 3:
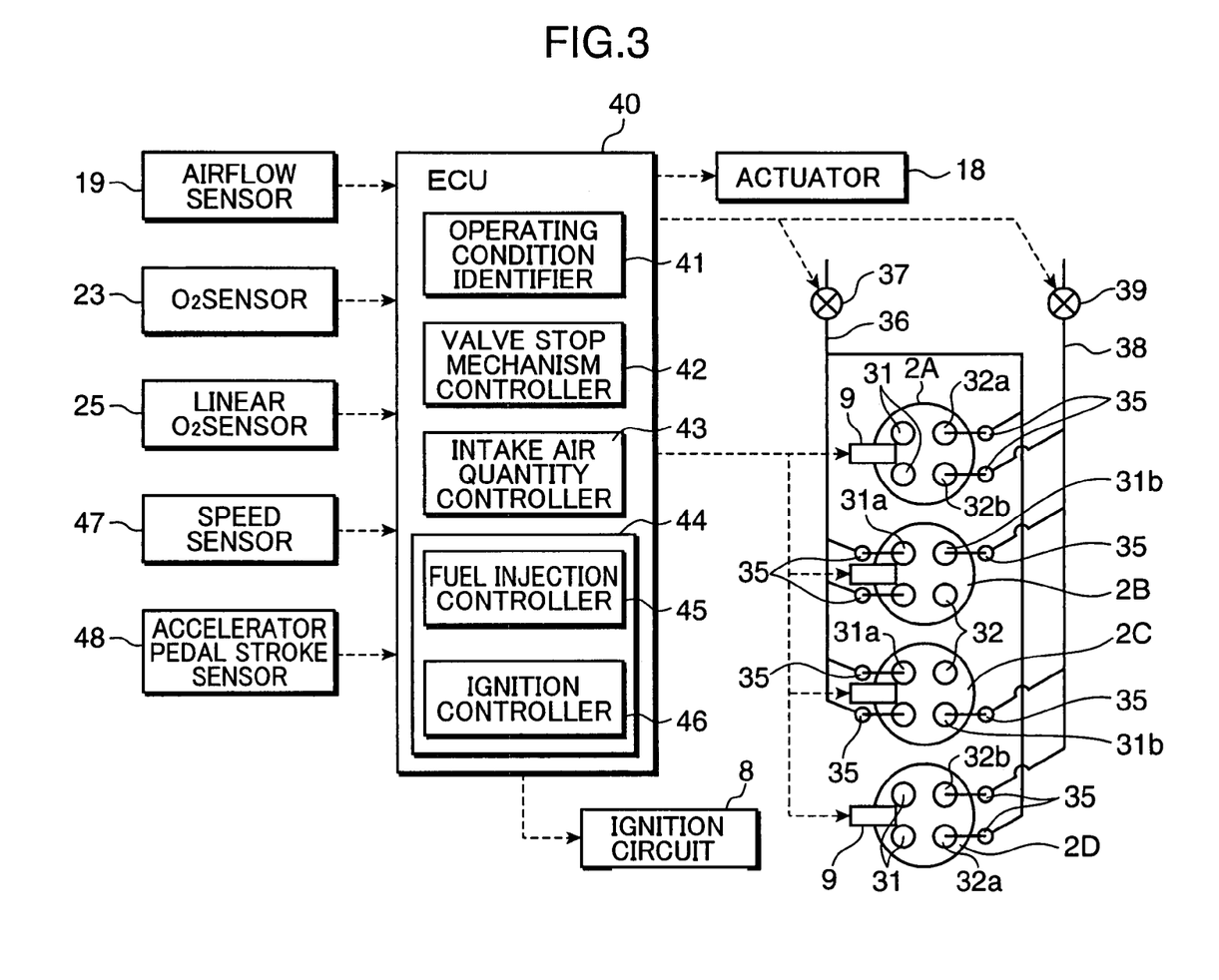
FIG. 3 is a block diagram of a control system.

A first control valve 37 is provided on a passage 36 for supplying and discharging operating fluid to and from the valve stop mechanism 35 of the first exhaust valve 32a and the valve stop mechanism 35 of the first intake valve 31a, and a second control valve 39 is provided on a passage 38 for supplying and discharging operating fluid to and from the valve stop mechanism 35 of the second exhaust valve 32b and the valve stop mechanism 35 of the second intake valve 31b (see FIG. 3).

FIG. 3 shows the constitutions of the driving and control systems. In the drawing, signals from the airflow sensor 19, $O_2$ sensor 23, and linear $O_2$ sensor 25 are inputted into an ECU (control unit) 40 for controlling the engine, which is constituted by a microcomputer or the like, and signals from an engine speed sensor 47 for detecting the engine speed in order to determine the operating condition and an accelerator pedal stroke sensor 48 for detecting the accelerator pedal stroke (accelerator pedal depression amount) are also inputted. Control signals are outputted from the ECU 40 to the ignition circuit 8, fuel injectors 9, the actuator 18 of the multiple throttle valve 17, and the first and second control valves 37, 39.

The ECU 40 is constituted as a controller which causes combustion to be performed while maintaining the gas passages in a two-cylinder connection (see FIG. 6) in at least the low-load low-speed range, and comprises an operating condition identifier 41, a valve stop mechanism controller 42, an intake air quantity controller 43, and a combustion condition controller 44.

Figure 4:
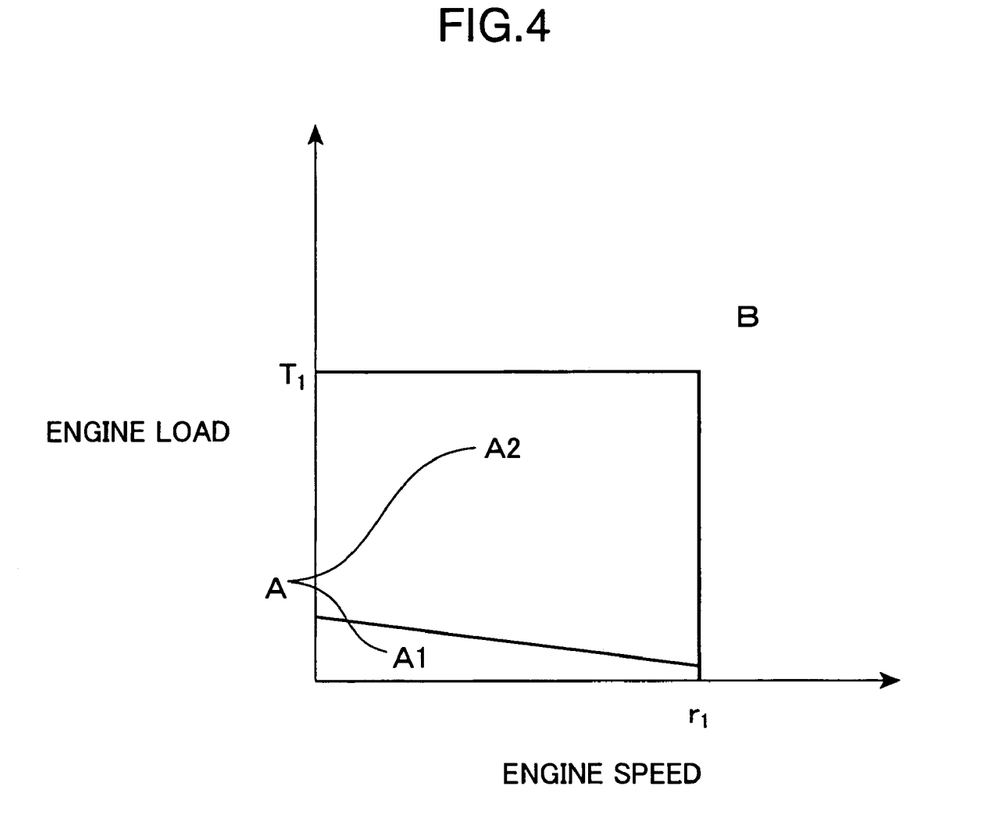
FIG. 4 is an illustrative view showing an operating range.

The operating condition identifier 41 checks the engine operating condition (the engine speed and engine load) using signals from the speed sensor 47, accelerator pedal stroke sensor 48, and so on, and thereby determined whether the operating condition is in a low-load low-speed side operating range A (comprising A1, A2), or a high-load, high-speed side operating range B, as shown in FIG. 4. Within the operating range A, the operating range A1 is a low-load range having a low temperature condition in which the temperature inside the following cylinders 2B, 2C is not high enough for combustion through compression ignition. The operating range A1 is set to vary according to the temperature inside the following cylinders 2B, 2C. For example, when the engine water temperature is relatively low, the temperature inside the following cylinders 2B, 2C is also low, and hence the range expands, but when the temperature is high, the range is set to contract. Note that an idling condition is included in the operating range A1. The operating range A2, on the other hand, is on a higher load side than the operating range A1, and combustion in the following cylinders 2B, 2C is performed by compression ignition in this range.

As a rule, operations are performed in a state of two-cylinder connection in the operating range A (to be referred to as a special operation mode hereinafter), and operations are performed in a state in which each cylinder is independent in the operating range B (to be referred to as a normal operation mode hereinafter).

The valve stop mechanism controller 42 controls the control valves 37, 39 according to the special operation mode and normal operation mode, and thereby controls the valve stop mechanisms 35 as follows.

Special Operation Mode:
first exhaust valve 32a and first intake valve 31a are stopped
second exhaust valve 32b and second intake valve 31b are operative Normal Operation Mode:
first exhaust valve 32a and first intake valve 31a are operative
second exhaust valve 32b and second intake valve 31b are stopped The intake air quantity controller 43 controls the opening of the multiple throttle valve 17 (throttle opening) by controlling the actuator 18. A target intake air quantity is determined from a map or the like according to the operating condition, and the throttle opening is controlled in accordance with this target intake air quantity. As will be described below, in the special operation mode combustion is performed in the following cylinders (second and third cylinders 2B, 2C) in a state in which the intake air from the branched intake channels 16 is blocked, and while keeping the excess air in the gas introduced from the preceding cylinders and the newly supplied fuel at the stoichiometric air-fuel ratio. Hence the throttle opening is adjusted such that air is supplied to the preceding cylinders (first and fourth cylinders 2A, 2D) in a quantity required for fuel combustion corresponding to the required torque of the two preceding and following cylinders (a sufficient quantity of air to reach the stoichiometric air-fuel ratio with the fuel quantity for two cylinders).

The combustion condition controller 44 is constituted by a fuel injection controller 45 and an ignition controller 46. The fuel injection controller 45 is used to control the fuel injection quantity and injection timing from the fuel injector 9 provided for each cylinder 2A to 2D in accordance with the engine operating condition, and the ignition controller 46 is used to perform ignition timing control, control for halting ignition, and so on in accordance with the operating condition. In particular, combustion control (fuel injection control and ignition control) is modified according to whether the operating condition is in special operation mode or normal operation mode.

More specifically, in special operation mode, the quantity of fuel injected into the preceding cylinders (first and fourth cylinders 2A, 2D) is controlled to reach a leaner air-fuel ratio than the stoichiometric air-fuel ratio, the injection timing is set such that fuel is injected in the compression stroke to stratify the air-fuel mixture, and the ignition timing is set such that spark ignition is performed in the vicinity of compression top dead center. In the following cylinders (second and third cylinders 2B, 2C), fuel is supplied to the lean air-fuel ratio burned gas introduced from the preceding cylinders, the fuel injection quantity is controlled to reach a substantially stoichiometric air-fuel ratio, and the injection timing is set such that fuel is injected during the intake stroke. When the operating condition is in the operating range A1 in FIG. 4, combustion is performed through spark ignition, and when the operating condition is in the operating range A2 in FIG. 4, combustion is performed through compression ignition.

In normal operation mode, on the other hand, the fuel injection quantity is controlled such that the air-fuel ratio of each cylinder 2A to 2D reaches or falls below the stoichiometric air-fuel ratio. For example, in the majority of the normal operation mode the air-fuel ratio is controlled to the stoichiometric air-fuel ratio, and at full load or an operating range in the vicinity thereof, the air-fuel ratio is controlled to be richer than the stoichiometric air-fuel ratio. In this case, injection timing is set for each cylinder 2A to 2D such that fuel is injected in the intake stroke to obtain a uniform air-fuel mixture, and spark ignition is performed in all of the cylinders 2A to 2D.

Figure 8:
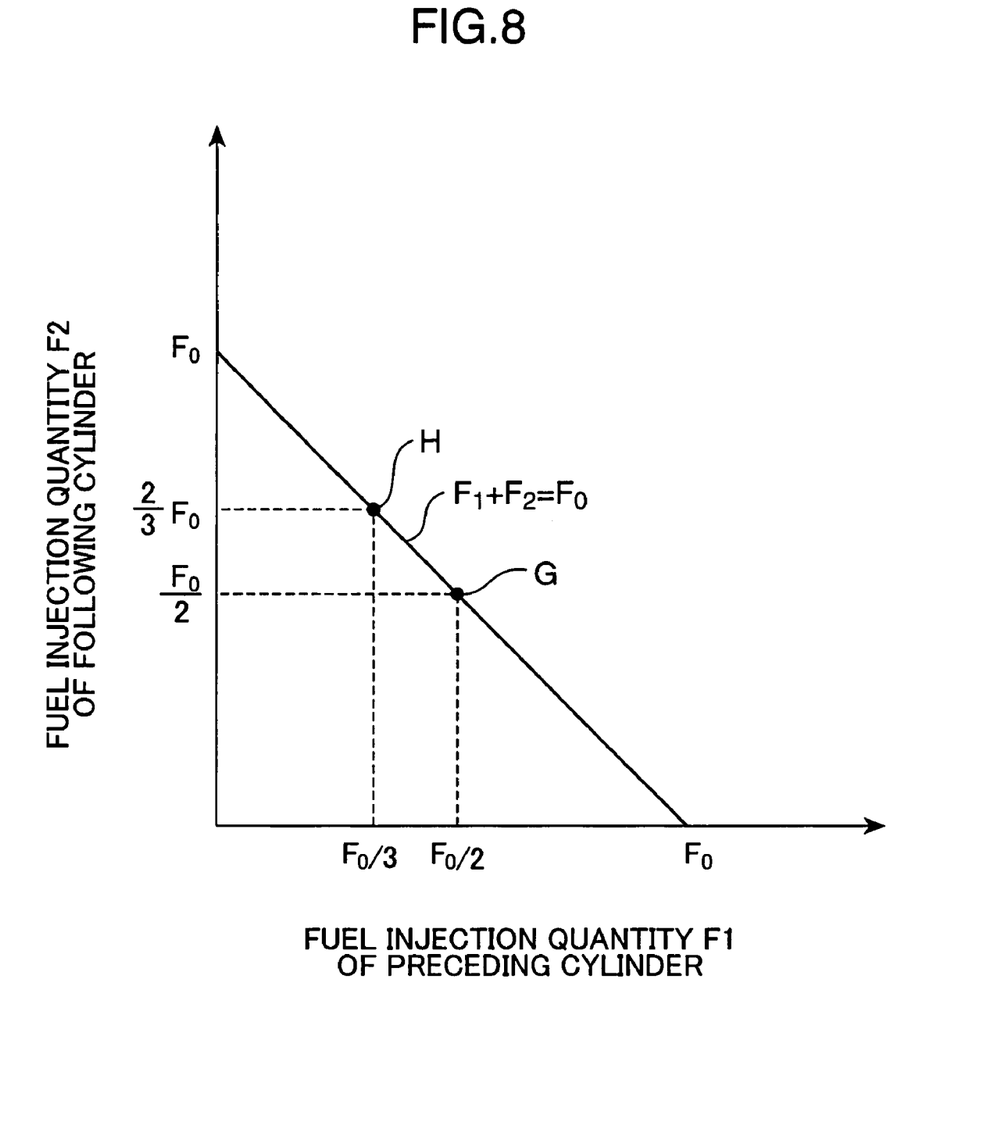
FIG. 8 is a graph showing the fuel injection quantity of each cylinder.

FIG. 8 is a graph showing the relationship between the fuel injection quantity of the following cylinders and the fuel injection quantity of the preceding cylinders during special operation mode and at a constant intake air quantity. The horizontal axis shows a fuel injection quantity F1 of the preceding cylinders 2A, 2D, and the vertical axis shows a fuel injection quantity F2 of the following cylinders 2B, 2C. If a fuel feeding quantity at which the stoichiometric air-fuel ratio is reached in relation to the quantity of air taken in by the preceding cylinders 2A, 2D is set as F0, then the fuel injection quantities F1, F2 have a relationship of F1+F2=F0, as shown in FIG. 8. Hence when the fuel injection quantity F1 of the preceding cylinders is increased or decreased, the fuel injection quantity F2 of the following cylinders increases or decreases accordingly in the opposite direction.

In the high-load side range (the operating range A2 in FIG. 4), a reference is set whereby the fuel injection quantity F1 of the preceding cylinders equals half of the fuel feeding quantity F0 (point G in FIG. 8), and this ratio increases and decreases in accordance with the load. In other words, F1/F0 is set to become smaller as the load decreases. In the low-load range (the operating range A1 in FIG. 4), on the other hand, the fuel injection quantity F1 of the preceding cylinders is set to one third or less of the fuel feeding quantity F0 (point H in FIG. 8). The fuel injection quantity F2 of the following cylinders at this time is at least two thirds of the fuel feeding quantity F0.

Figure 9:
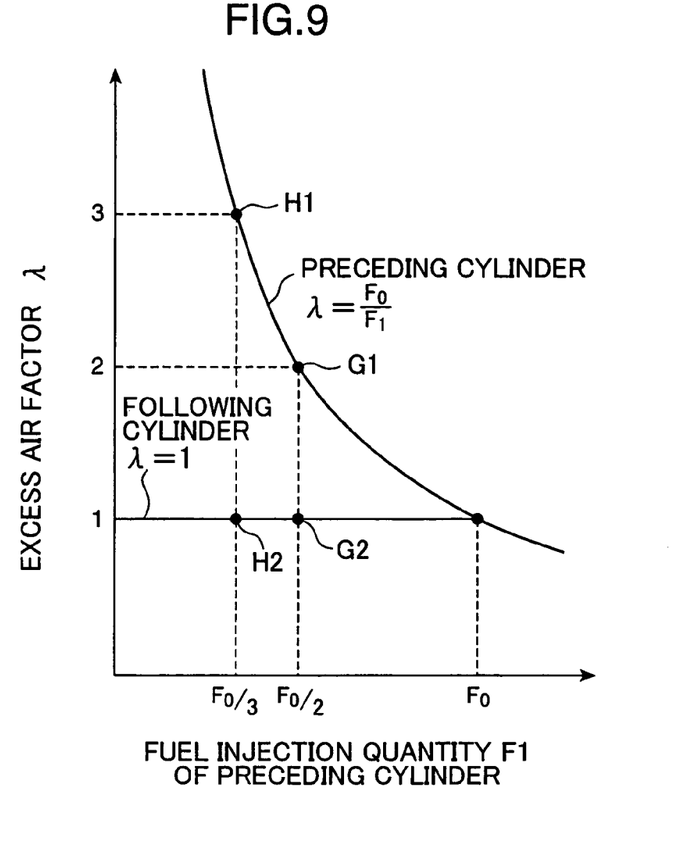
FIG. 9 is a graph showing the excess air factor (air ratio) of each cylinder.

FIG. 9 is a graph showing the relationship between the fuel injection quantity of the preceding cylinders and the excess air factor (air ratio) in the preceding cylinders and following cylinders. The horizontal axis shows the fuel injection quantity F1 of the preceding cylinders 2A, 2D, and the vertical axis shows the excess air factor $\lambda$ in each cylinder. The excess air factor $\lambda$ is a parameter indicating the number of times by which the air-fuel ratio is larger than the stoichiometric air-fuel ratio ($\lambda=1$). When the fuel injection quantity of each cylinder has a relationship of F1+F2=F0, as shown in FIG. 8, the excess air factor $\lambda$ of the preceding cylinders 2A, 2D has a relationship of $\lambda=F0/F1$, as shown in FIG. 9. Hence in the preceding cylinders 2A, 2D, the excess air factor $\lambda$ decreases as the fuel injection quantity F1 increases, and the excess air factor $\lambda$ increases as the fuel injection quantity F1 decreases.

When the fuel injection quantity F1 of the preceding cylinders is half of the fuel feeding quantity F0 (point G in FIG. 8), the excess air factor $\lambda$ of the preceding cylinders reaches two (point G1 in FIG. 9). When the fuel injection quantity F1 of the preceding cylinders is one third of the fuel feeding quantity F0 (point H in FIG. 8), the excess air factor $\lambda$ of the preceding cylinders reaches three (point H1 in FIG. 9). In the low-load side operating range A1, the excess air factor is set to $\lambda \geq 3$, for example an excess air factor of $\lambda=3.4$ (air-fuel ratio$\approx$50).

In the following cylinders 2B, 2C, the fuel injection quantity F2 is caused to increase and decrease in accordance with and in the opposite direction to increases and decreases in the fuel injection quantity F1 of the preceding cylinders, as shown in FIG. 8. Hence the substantial air-fuel ratio reaches the stoichiometric air-fuel ratio, and the excess air factor $\lambda$ thereof becomes $\lambda=1$ (constant), as shown at points G2 and H2 in FIG. 9.

Figure 10:
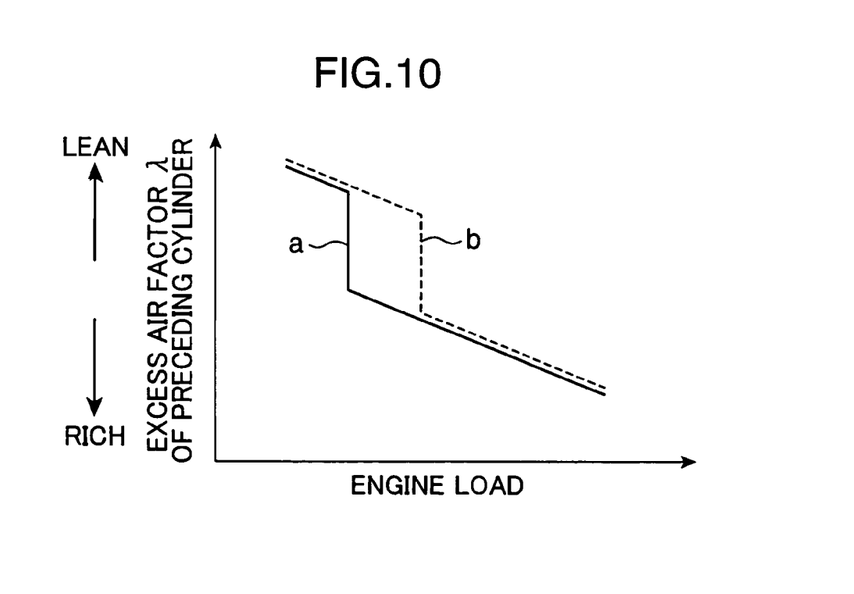
FIG. 10 is a graph showing the relationship between engine load and the excess air factor.

FIG. 10 is a graph showing the relationship between the engine load and the excess air factor of the preceding cylinders in the special operation mode. In the graph, a (the solid line) and b (the broken line) respectively indicate the characteristics of a normal temperature period and a low temperature period. As shown in the graph, the excess air factor $\lambda$ is set to become larger (toward the lean side) as the engine load decreases. The bending points at which the characteristic alters greatly indicate spark ignition or the boundary with compression ignition in the following cylinders. In other words, the excess air factor $\lambda$ of the preceding cylinders 2A, 2D is set to become particularly large during a low-load period when combustion is performed in the following cylinders 2B, 2C by spark ignition.

The actions of the above-described device of this embodiment will be described with reference to FIGS. 4 through 10. As described above, in special operation mode the first exhaust valve 32a and first intake valve 31a are halted, whereas the second exhaust valve 32b and second intake valve 31b are made operative. In so doing, a substantial fresh air and gas flow path is formed as shown in FIG. 6 to create a two-cylinder connection in which burned gas discharged from the preceding cylinders (first and fourth cylinders) 2A, 2D is introduced as is into the following cylinders (second and third cylinders) 2B, 2C via the intercylinder gas channels 22, and only the gas that is discharged from the following cylinders 2B, 2C is led to the exhaust passage 20.

In this state, fresh air from the intake passage 15 is introduced into each of the preceding cylinders 2A, 2D in the intake stroke (the arrow a in FIG. 6), fuel is injected in the compression stroke while feedback-controlling the fuel injection quantity such that the air-fuel ratio of the preceding cylinders 2A, 2D, which is detected by the linear $O_2$ sensor 25, becomes a leaner air-fuel ratio than the stoichiometric air-fuel ratio, and combustion is performed by performing ignition at a predetermined ignition timing (see FIG. 5).

Figure 6:
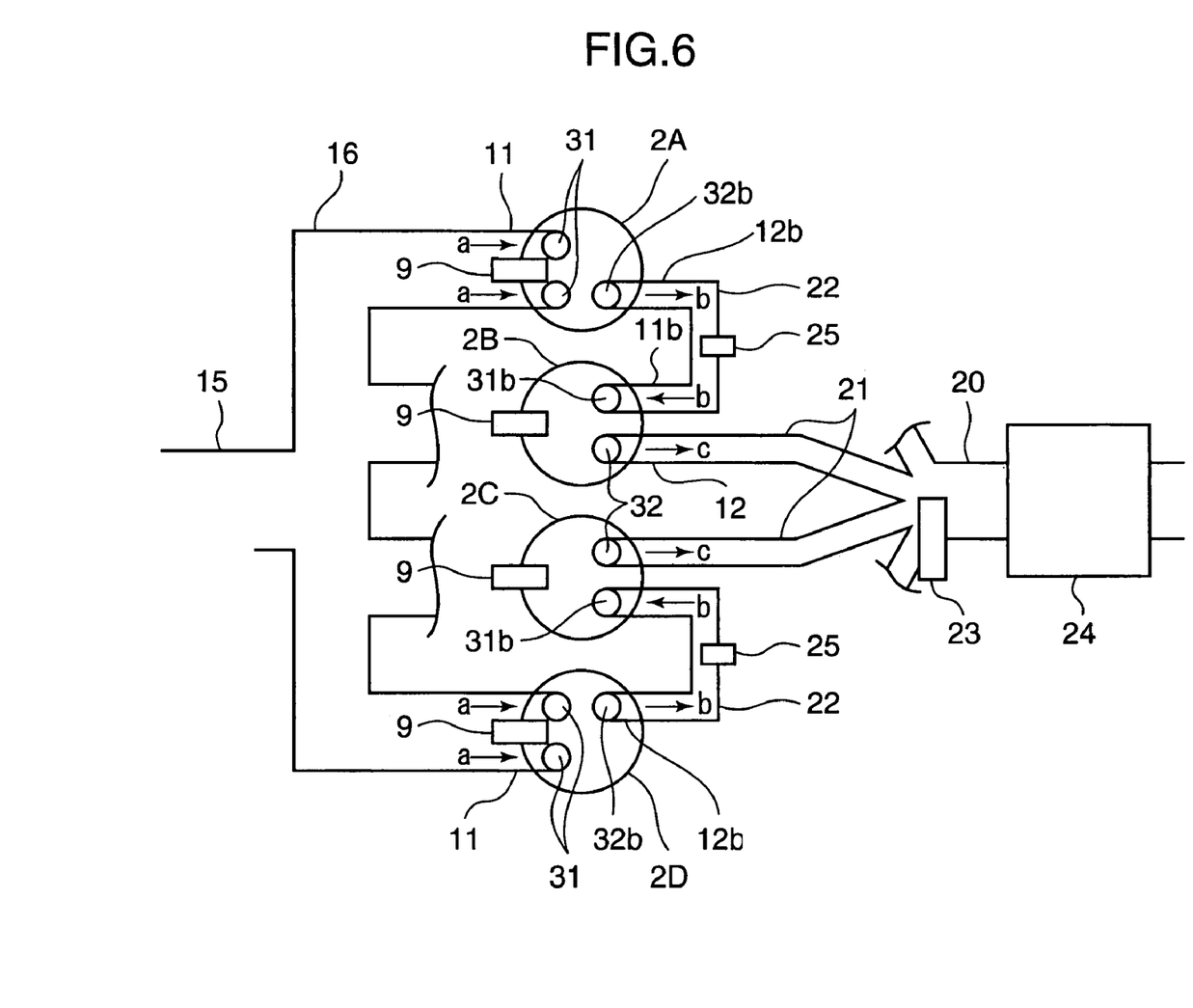
FIG. 6 is an illustrative view showing flow paths of substantially fresh air and gas at low-load and low-speed.

At the point in time when the intake stroke of the preceding cylinders 2A, 2D and the exhaust stroke of the following cylinders 2B, 2C overlap, the burned gas discharged from the preceding cylinders 2A, 2D is introduced into the following cylinders 2B, 2C through the intercylinder gas channels 22 (the outlined arrow in FIG. 5 and the arrow b in FIG. 6). Fuel is then supplied to the lean air-fuel ratio burned gas introduced into the following cylinders 2B, 2C from the preceding cylinders 2A, 2D, and while controlling the fuel injection quantity so as to reach a substantially stoichiometric air-fuel ratio, fuel is injected in the intake stroke. In the low-load side range (the operating range A1 in FIG. 4), combustion is performed by spark ignition, and in the high-load side range (the operating range A2 in FIG. 4), the pressure and temperature inside the combustion chamber are raised in the vicinity of the top dead center of the compression stroke, whereby compression ignition is performed.

Thus in the preceding cylinders 2A, 2D, combustion is performed at a lean air-fuel ratio having excess air, and by means of this lean combustion, thermal efficiency is increased and pumping loss is reduced, leading to a large improvement in fuel economy. In the following cylinders 2B, 2C, combustion is performed by feeding additional fuel to the lean air-fuel ratio burned gas introduced from the preceding cylinders 2A, 2D. Since the temperature of the gas introduced from the preceding cylinders 2A, 2D through the intercylinder gas channels 22 is high, vaporization of the additional fuel is precipitated, whereby favorable combustion can be obtained in the following cylinders 2B, 2C. Further, by performing combustion at a lean air-fuel ratio in the preceding cylinders 2A, 2D, the amount of NOx generated is suppressed to a comparatively low level, and by introducing burned gas into the following cylinders 2B, 2C from the preceding cylinders 2A, 2D, a similar state to when a large amount of EGR is performed can be obtained, whereby NOx generation is suppressed and exhaust gas purification is precipitated.

In the operating range A1 in the special operation mode, the fuel injection quantity F1 of the preceding cylinders 2A, 2D is set to one third or less of the total fuel quantity F0, and stratified charge combustion is performed at an extremely lean air-fuel ratio of excess air factor $\lambda \geq 3$. As a result, thermal efficiency is improved, leading to an improvement in fuel economy. In the following cylinders 2B, 2C, the fuel injection quantity F2 is set to two thirds or more of the total fuel quantity F0, and combustion is performed by spark ignition at a substantially stoichiometric air-fuel ratio of excess air factor $\lambda = 1$. The intake air in the following cylinders 2B, 2C is high-temperature burned gas introduced from the preceding cylinders 2A, 2D, and hence vaporization of the fuel is precipitated, combustibility is improved, and pumping loss is even lower than in the preceding cylinders 2A, 2D. Since the ratio of fuel burned in the following cylinders 2B, 2C is increased, a further overall improvement in fuel economy is achieved.

By increasing the quantity of fuel fed to the following cylinders 2B, 2C, the temperature inside the cylinder rises comparatively quickly. When the temperature inside the following cylinders 2B, 2C rises, the operating range A1 contracts and it becomes easier to move to the operating range A2. By progressing rapidly to combustion through compression ignition, a further improvement in fuel economy can be achieved.

Note that this control is also performed in the vicinity of idling speed, thereby preventing misfire such that stable combustion is obtained. Also, a large improvement in fuel economy can be obtained while the temperature inside the following cylinders 2B, 2C rises rapidly.

In the operating range A2 of the special operation mode, the fuel injection quantities F1, F2 of the preceding cylinders 2A, 2D and the following cylinders 2B, 2C are set to identical reference quantities, and the ratio of the fuel injection quantity F1 of the preceding cylinders is set to increase as the load increases. Hence the temperature of the burned gas introduced into the following cylinders 2B, 2C rises easily, and the compression ignition performance in the following cylinders 2B, 2C is improved. Meanwhile, the temperature inside the following cylinders 2B, 2C rises sufficiently for combustion to be performed through compression ignition. As a result, combustion is performed at once throughout the entire combustion chamber 4 of the following cylinders 2B, 2C such that slow combustion which does not contribute to the work is avoided and an improvement in fuel economy is obtained.

Note that in the special operation mode, the air-fuel ratio of the preceding cylinders 2A, 2D is set to increase (further toward the lean side) as the load decreases, and hence an improvement in fuel economy can be obtained without reversing the variation trend of the air-fuel ratio in relation to variation in the load. As a result, control is facilitated and stable combustion can be obtained.

Figure 7:
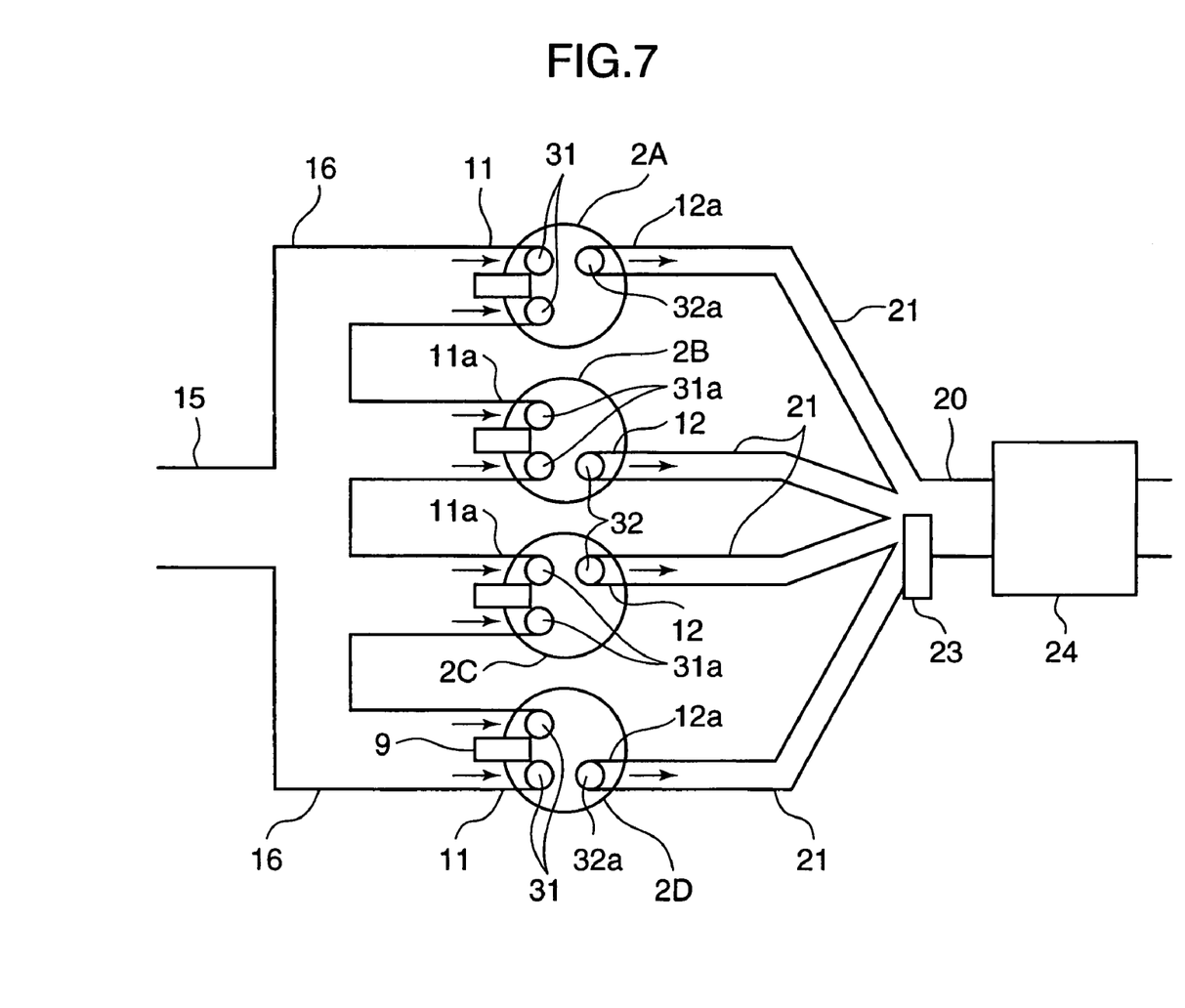
FIG. 7 is an illustrative view showing the flow paths of substantially fresh air and gas in a high-load, high-speed side operating range.

In normal operation mode, as described above, the first exhaust valve 32a and first intake valve 31a are made operative, and the second exhaust valve 32b and second intake valve 31b are stopped. In so doing, a substantially fresh air and gas flow path is formed as shown in FIG. 7 such that the intake ports 11, 11a and exhaust ports 12a, 12 of each cylinder 2A to 2D become substantially independent. Fresh air is then introduced into the intake ports 11, 11a of each cylinder 2A to 2D from the intake passage 15, and burned gas from the exhaust ports 12, 12a of each cylinder 2A to 2D is discharged into the exhaust passage 20. In this case, the intake air quantity and fuel injection quantity are controlled such that the air-fuel ratio equals or becomes richer than the stoichiometric air-fuel ratio, thereby ensuring output performance.

An embodiment of the present invention was described above, but the present invention is not limited to this embodiment, and may be modified appropriately within the scope of the claims. For example, configurations such as those described below are possible.

In this embodiment, the operating range A1 in FIG. 8 is set as a low temperature condition in which the following cylinders 2B, 2C do not reach a suitable temperature for combustion through compression ignition, and this range is set to be variable according to the engine water temperature and the like. However, a low temperature condition may also be determined in combination with the intake air temperature and so on. Further, by providing temperature measuring means to measure the temperature inside the following cylinders, or directly or indirectly measure the temperature inside the cylinders, a low temperature condition may be determined according to the measured or estimated value.

Setting of the excess air factor $\lambda$ of the preceding cylinders need not have the characteristic shown in FIG. 10, but may have any characteristic which slopes downward to the right. A more detailed characteristic may also be set in accordance with the engine speed and other conditions.

The present invention may be applied to a multi-cylinder engine other than a four-cylinder engine, for example a six-cylinder engine, eight-cylinder engine, or greater.

As described above, the controller of the present invention comprises a combustion controller which forms a gas flow path into a state of two-cylinder connection wherein, in at least a low-load low-speed range, burned gas discharged from a preceding cylinder, which is a cylinder in the exhaust stroke, of a pair of cylinders having an overlapping exhaust stroke and intake stroke is introduced as is into a following cylinder, which is a cylinder on the intake stroke side, through an intercylinder gas channel, and exhaust gas discharged from the following cylinder is led to an exhaust passage, and which, during the two-cylinder connection, causes combustion to be performed in the preceding cylinder at an air-fuel ratio which is leaner than the stoichiometric air-fuel ratio by a predetermined amount, and causes combustion to be performed in the following cylinder at a predetermined air-fuel ratio by feeding fuel to the lean air-fuel ratio burned gas introduced from the preceding cylinder, wherein, in at least a part of an operating range in which the two-cylinder connection is set, control is executed such that combustion is performed in the following cylinder through compression ignition, and during a predetermined low temperature condition within the operating range in which the two-cylinder connection is set, wherein the temperature inside the following cylinder is determined not to have reached a suitable temperature for combustion through compression ignition, combustion is performed in the following cylinder by spark ignition with a substantial air-fuel ratio set to the stoichiometric air-fuel ratio, and in the preceding cylinder the air-fuel ratio is increased in comparison to a case in which combustion is performed in the following cylinder through compression ignition. Thus an improvement in thermal efficiency and a reduction in pumping loss are obtained, leading to a large improvement in fuel economy. The exhaust purification performance can also be improved. When combustion is performed in the following cylinder through compression ignition, a further improvement in fuel economy is achieved due to rapid combustion. Fuel economy is also improved during a low temperature condition, in which the temperature inside the following cylinder is determined not to have reached a suitable temperature for compression ignition, and since this type of low temperature condition progresses rapidly to combustion through compression ignition, a further overall improvement in fuel economy can be obtained.

In summary, a spark-ignition engine controller for a multi-cylinder spark-ignition engine in which a cycle comprising an intake stroke, a compression stroke, an expansion stroke, and an exhaust stroke is performed at a predetermined phase difference in each cylinder, comprising a combustion controller which forms a gas flow path into a state of two-cylinder connection wherein, in at least a low-load low-speed range, burned gas discharged from a preceding cylinder, which is a cylinder in the exhaust stroke, of a pair of cylinders having an overlapping exhaust stroke and intake stroke is introduced as is into a following cylinder, which is a cylinder on the intake stroke side, through an intercylinder gas channel, and exhaust gas discharged from the following cylinder is led to an exhaust passage, and which, during the two-cylinder connection, causes combustion to be performed in the preceding cylinder at an air-fuel ratio which is leaner than the stoichiometric air-fuel ratio by a predetermined amount, and causes combustion to be performed in the following cylinder at a predetermined air-fuel ratio by feeding fuel to the lean air-fuel ratio burned gas introduced from the preceding cylinder, wherein, in at least a part of an operating ran e in which the two-cylinder connection is set, control is executed such that combustion is performed in the following cylinder through compression ignition, and during a predetermined low temperature condition within the operating range in which the two-cylinder connection is set, wherein the temperature inside the following cylinder is determined not to have reached a suitable temperature for combustion through compression ignition, combustion is performed in the following cylinder by spark ignition with the substantial air-fuel ratio set to the stoichiometric air-fuel ratio, and in the preceding cylinder the air-fuel ratio is increased in comparison with a case in which combustion is performed in the following cylinder through compression ignition.

According to this constitution, in at least a low-load low-speed range, combustion is performed in the preceding cylinder at a lean air-fuel ratio having excess air, and by means of this lean combustion, thermal efficiency is increased and pumping loss is reduced, leading to a large improvement in fuel economy. In the following cylinder, combustion is performed by feeding additional fuel to the lean air-fuel ratio burned gas introduced from the preceding cylinder. The temperature of the gas introduced from the preceding cylinder through the intercylinder gas channel is high, and hence vaporization of the additional fuel is precipitated, whereby favorable combustion can be obtained in the following cylinder. Further, by performing combustion at a lean air-fuel ratio in the preceding cylinder, the amount of NOx generated is suppressed to a comparatively low level, and by introducing burned gas from the preceding cylinder into the following cylinder, a similar state to when a large amount of EGR is performed can be obtained, whereby NOx generation is sufficiently suppressed and exhaust gas purification is precipitated. When compression ignition is performed in the following cylinder, combustion is performed at once throughout the entire combustion chamber, thereby avoiding slow combustion which does not contribute to the work and obtaining a large improvement in fuel economy.

When combustion is performed through spark ignition during a low temperature condition in which it is determined that the temperature inside the following cylinder has not reached a suitable temperature for combustion through compression ignition, the air-fuel ratio in the preceding cylinder is increased (toward the lean side), and by means of this lean combustion, thermal efficiency is improved. In the following cylinder, a substantial air-fuel ratio (in this specification, this refers to a ratio of fresh air and fuel corresponding to the ratio of oxygen and fuel during combustion in the following cylinder) is set to the stoichiometric air-fuel ratio. In other words, if the intake air quantity is constant, then the total quantity of fuel fed to the preceding cylinder and following cylinder is constant (the ratio of the intake air quantity and the total fuel quantity is the stoichiometric air-fuel ratio). Hence the quantity of fuel fed to the following cylinder increases by the amount of increase in the air-fuel ratio caused by reducing the amount of fuel fed to the preceding cylinder. The intake gas of the following cylinder is the high-temperature burned gas introduced from the preceding cylinder, precipitating vaporization of the fuel, and thus combustibility is improved and pumping loss is even lower than in the preceding cylinder. By increasing the ratio of fuel burned in the following cylinder, a further overall improvement in fuel economy can be achieved. Further, by increasing the quantity of fuel fed to the following cylinder, the temperature inside the cylinder rises quickly, enabling a rapid progression to combustion through compression ignition, and thus a greater improvement in fuel economy can be obtained.

In the aforementioned spark-ignition engine controller, wherein, during the aforementioned predetermined low temperature condition, the air-fuel ratio of the preceding cylinder is set such that the excess air factor reaches three or more, and at this time stratified charge combustion is performed in the preceding cylinder.

In so doing, a fuel quantity of one third or less of the total fuel quantity is fed to the preceding cylinder, and two thirds or more of the total fuel quantity is fed to the following cylinder. By setting the excess air factor in the preceding cylinder to three or more such that an extremely lean air-fuel ratio of approximately 50, for example, is obtained, thermal efficiency can be greatly improved, and a striking improvement in fuel economy can be obtained. In the following cylinder, the fuel injection quantity is increased by at least 30% in comparison to a case in which a half of the total fuel quantity is fed thereto, for example. This contributes greatly to improvements in fuel economy, and also enables the temperature inside the cylinder to be increased rapidly.

Note that although such an extremely lean air-fuel ratio is set in the preceding cylinder, stratified charge combustion is performed such that the fuel concentration on the periphery of the spark plug during ignition increases, and hence stable combustion can be obtained.

Furthermore, in the spark-ignition engine controller, in a predetermined low-load range within the operating range in which the two-cylinder connection is set, the air-fuel ratio in the preceding cylinder is preferably set to increase relative to that in a higher load side operating range.

Moreover, in the operating range in which the two-cylinder connection is set, the air-fuel ratio of the preceding cylinder is preferably set to increase as the load decreases.

Hence in the low-load range, the air-fuel ratio of the preceding cylinder is set to increase, or in other words to move toward the lean side, as the load decreases even further. As a result, the effects are obtained without reversing the variation trend of the air-fuel ratio in relation to variation in the load, thereby facilitating control and enabling stable combustion. As the load increases, the air-fuel ratio of the preceding cylinder moves toward the rich side, causing the temperature of the burned gas introduced into the following cylinder to rise, and as a result the compression ignition performance in the following cylinder can be improved.

Yet, furthermore, in the spark-ignition engine controller, control in accordance with the predetermined low temperature condition is performed when the engine speed is at or in the vicinity of idling speed.

In so doing, misfires are prevented and stable combustion is obtained even in a low-load low-speed range at or in the vicinity of idling speed. Moreover, a large improvement in fuel economy can be obtained while the temperature inside the following cylinder rises rapidly.

This application is based on Japanese patent application serial no. 2002-294835, filed in Japan Patent Office on Oct. 8, 2002, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A spark-ignition engine controller for a multi-cylinder spark-ignition engine performing a four cycle consisting of an intake stroke, a compression stroke, an expansion stroke, and an exhaust stroke at a predetermined phase difference in each cylinder, wherein a gas flow path is formed into a state of two-cylinder connection where, in at least a low-load low-speed range, determined by an operation condition identifier, burned gas discharged from a preceding cylinder, which is a cylinder in the exhaust stroke, of a pair of cylinders having an overlapping exhaust stroke and intake stroke is introduced into a following cylinder, which is a cylinder in the intake stroke, through an intercylinder gas channel, and exhaust gas discharged from the following cylinder is led to an exhaust passage; said spark-ignition engine controller comprising:

the operation condition identifier for determining an engine operation condition based on an engine speed and an engine load;

an intake air quantity control means for controlling an amount of air to be supplied to the preceding cylinder in such a manner that the air/fuel ratio based on the amount of fuel required to both of said preceding and the following cylinders becomes a stoichiometric air-fuel ratio in said both cylinders in the state of two-cylinder connection; and a combustion controller including:

a fuel injection means for injecting fuel at a certain timing in which an amount of fuel injected to both of said preceding and following cylinders is determined in accordance with a required torque in the state of two-cylinder connection; and an ignition controller for controlling an ignition timing;

said combustion controller which, during said two-cylinder connection, causes combustion to be performed in said preceding cylinder at an air-fuel ratio which is leaner than the stoichiometric air-fuel ratio by a predetermined amount, and causes combustion in said following cylinder at a predetermined air-fuel ratio by feeding fuel to the lean air-fuel ratio burned gas introduced from said preceding cylinder, said combustion controller performing control such that, in at least a part of an operating range in which said two-cylinder connection is set, combustion is performed in said following cylinder through compression ignition, and said combustion controller controlling, in a low-load region among said operating range in which the two-cylinder connection is set, said injection controller and said ignition controller such that an air-fuel ratio of the preceding cylinder is set such that an excess air ratio of the preceding cylinder becomes at least three and a combustion is performed in the following cylinder by spark ignition at an air-fuel ratio being equal to a stoichiometric air-fuel ratio.

2. The spark-ignition engine controller according to claim 1, wherein, a fuel amount injected to said both cylinders consisting of said preceding cylinder and said following cylinder is set such that a supplied fuel amount to the preceding cylinder is ⅓ or less and a supplied fuel amount to the following cylinder is at least ⅔ against the total amount of the fuel injected to said both cylinders and at this time stratified charge combustion is performed in the preceding cylinder in a low load operation range within the operation range where the two-cylinder connection is set.

3. The spark-ignition engine controller according to claim 1, wherein, in the low-load range within the operating range in which said two-cylinder connection is set, the ratio of the fuel injection quantity in said preceding cylinder is set to increase as the engine load increases.

4. The spark-ignition engine controller according to claim 1, wherein, in the low-load range within the operating range in which said two-cylinder connection is set, the fuel is injected to the preceding cylinder in compression stroke and the fuel is injected to the following cylinder in expansion stroke.

5. A multi-cylinder spark-ignition engine comprising:
a plurality of cylinders, each of which performs 4 cycles, consisting of an intake stroke, a compression stroke, an expansion stroke, and an exhaust stroke at a predetermined phase difference in each cylinder;
a gas flow path which is formed into a state of two-cylinder connection: including an intercylinder gas channel and an exhaust passage such that, in at least a low-load low-speed range, determined by an operation condition identifier, burned gas discharged from a preceding cylinder, which is a cylinder in the exhaust stroke, of a pair of cylinders having an overlapping exhaust stroke and intake stroke is introduced into a following cylinder, which is a cylinder on the intake stroke side, through said intercylinder gas channel, and exhaust gas discharged from the following cylinder is led to said exhaust passage;
a spark-ignition engine controller including:
the operation condition identifier for determining an engine operation condition based on an engine speed and an engine load;
an intake air quantity control means for controlling an amount of air to be supplied to the preceding cylinder in such a manner that the air/fuel ratio based on the amount of fuel required to both of said preceding and the following cylinders becomes a stoichiometric air-fuel ratio in said both cylinders in the two-cylinder connection state; and
a combustion controller including:
an fuel injection means for injecting fuel at a certain timing in which an amount of fuel injected to both of said preceding and following cylinders is determined in accordance with a required torque in the state of two-cylinder connection; and
an ignition controller for controlling an ignition timing;
said combustion controller which, during said two-cylinder connection, causes combustion to be performed in said preceding cylinder at an air-fuel ratio which is leaner than the stoichiometric air-fuel ratio by a predetermined amount, and causes combustion in said following cylinder at a predetermined air-fuel ratio by feeding fuel to the lean air-fuel ratio burned gas introduced from said preceding cylinder,
said combustion controller performing control such that, in at least a part of an operating range in which said two-cylinder connection is set, combustion is performed in said following cylinder through compression ignition, and
said combustion controller controlling, in a low-load region among said operating range in which the two-cylinder connection is set, said injection controller and said ignition controller such that an air-fuel ratio of the preceding cylinder is set such that an excess air ratio of the preceding cylinder becomes at least three and a combustion is performed in the following cylinder by spark ignition at an air-fuel ratio being equal to a stoichiometric air-fuel ratio.

* * * * *